United States Patent
Lesperance et al.

(10) Patent No.: US 11,677,783 B2
(45) Date of Patent: Jun. 13, 2023

(54) ANALYSIS OF POTENTIALLY MALICIOUS EMAILS

(71) Applicant: Target Brands, Inc., Minneapolis, MN (US)

(72) Inventors: Adam Lesperance, Minneapolis, MN (US); Andrew O. Orr, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 150 days.

(21) Appl. No.: 17/022,878

(22) Filed: Sep. 16, 2020

(65) Prior Publication Data

US 2021/0126944 A1    Apr. 29, 2021

Related U.S. Application Data

(60) Provisional application No. 62/926,209, filed on Oct. 25, 2019.

(51) Int. Cl.
*H04L 9/40* (2022.01)
*H04L 51/08* (2022.01)
*H04L 51/42* (2022.01)

(52) U.S. Cl.
CPC .......... *H04L 63/1483* (2013.01); *H04L 51/08* (2013.01); *H04L 51/42* (2022.05); *H04L 63/1433* (2013.01)

(58) Field of Classification Search
CPC ..... H04L 63/1483; H04L 51/08; H04L 51/22; H04L 63/1433
See application file for complete search history.

(56) References Cited

U.S. PATENT DOCUMENTS

| | | | | |
|---|---|---|---|---|
| 7,877,807 | B2* | 1/2011 | Shipp | G06F 21/562 726/22 |
| 8,484,741 | B1* | 7/2013 | Chapman | H04L 63/1483 709/206 |
| 8,615,807 | B1* | 12/2013 | Higbee | H04L 63/20 726/25 |
| 9,154,514 | B1* | 10/2015 | Prakash | G06Q 10/107 |
| 9,858,440 | B1* | 1/2018 | Wang | G06F 21/64 |
| 10,255,809 | B1* | 4/2019 | Ledet | H04L 67/55 |
| 10,277,628 | B1* | 4/2019 | Jakobsson | H04L 63/1416 |
| 10,671,726 | B1* | 6/2020 | Paithane | H04L 63/1416 |

(Continued)

FOREIGN PATENT DOCUMENTS

WO    WO 2016/164844    10/2016

*Primary Examiner* — Ninos Donabed
(74) *Attorney, Agent, or Firm* — Barnes & Thornburg LLP

(57) ABSTRACT

Systems and methods are provided for automatically analyzing emails that have been flagged as being potentially malicious (e.g., phishing attempts) to determine whether the permit or block the email. The systems and methods can use a scoring framework to determine whether the email is part of a phishing attempt. A set of rules are provided, and points are awarded to the email based on which of a set of rules are satisfied for the email. An email that exceeds a scoring threshold can be identified as a phishing attempt for potential evaluation, and can be routed to a security analyst for further analysis and process. After a predetermined period of time, the system can rerun analysis of emails which have not been identified as phishing attempts and determine if such emails now exceed the scoring threshold.

20 Claims, 9 Drawing Sheets

(56) References Cited

U.S. PATENT DOCUMENTS

| | | | |
|---|---|---|---|
| 10,834,128 B1* | 11/2020 | Rajagopalan | H04L 51/212 |
| 10,904,266 B1* | 1/2021 | Greevy | H04L 63/105 |
| 2006/0101120 A1* | 5/2006 | Helsper | H04L 51/212 |
| | | | 709/206 |
| 2006/0168066 A1* | 7/2006 | Helsper | H04L 63/1466 |
| | | | 709/206 |
| 2008/0104052 A1* | 5/2008 | Ryan | G06Q 10/107 |
| | | | 707/999.005 |
| 2008/0177994 A1* | 7/2008 | Mayer | G06F 16/00 |
| | | | 709/224 |
| 2008/0320119 A1* | 12/2008 | Achan | H04L 63/1408 |
| | | | 709/222 |
| 2009/0150448 A1* | 6/2009 | Lechner | G06F 16/9535 |
| 2009/0157675 A1* | 6/2009 | Stellhorn | G06Q 10/107 |
| 2010/0174788 A1* | 7/2010 | Vitaldevara | H04L 51/212 |
| | | | 709/206 |
| 2010/0306845 A1* | 12/2010 | Vaithilingam | G06Q 10/107 |
| | | | 709/206 |
| 2012/0079007 A1* | 3/2012 | Brown | H04L 51/08 |
| | | | 709/206 |
| 2012/0244500 A1* | 9/2012 | Marinescu | G06Q 10/06398 |
| | | | 434/107 |
| 2013/0086636 A1* | 4/2013 | Golovanov | G06F 21/56 |
| | | | 726/3 |
| 2014/0230050 A1 | 8/2014 | Higbee et al. | |
| 2014/0244998 A1* | 8/2014 | Amenedo | H04L 9/007 |
| | | | 713/156 |
| 2014/0282872 A1* | 9/2014 | Hansen | G06F 21/56 |
| | | | 726/3 |
| 2014/0283038 A1* | 9/2014 | Call | H04L 63/1441 |
| | | | 726/22 |
| 2015/0067833 A1* | 3/2015 | Verma | H04L 63/1483 |
| | | | 726/22 |
| 2015/0074085 A1* | 3/2015 | Bamford | G06F 16/24578 |
| | | | 707/722 |
| 2015/0287336 A1* | 10/2015 | Scheeres | G09B 5/02 |
| | | | 434/156 |
| 2016/0014151 A1* | 1/2016 | Prakash | H04L 47/62 |
| | | | 726/22 |
| 2016/0021117 A1* | 1/2016 | Harmon | H04L 63/20 |
| | | | 726/1 |
| 2016/0164892 A1* | 6/2016 | Satish | H04L 63/0236 |
| | | | 726/23 |
| 2016/0344770 A1* | 11/2016 | Verma | H04L 51/42 |
| 2017/0034211 A1* | 2/2017 | Buergi | H04L 63/1425 |
| 2017/0235771 A1* | 8/2017 | Shah | H04L 51/18 |
| | | | 707/690 |
| 2018/0007066 A1* | 1/2018 | Goutal | H04L 63/1483 |
| 2018/0191754 A1* | 7/2018 | Higbee | H04L 63/1416 |
| 2018/0278647 A1* | 9/2018 | Gabaev | H04L 63/1425 |
| 2019/0130512 A1* | 5/2019 | Kuhn | H04L 67/00 |
| 2019/0238571 A1* | 8/2019 | Adir | H04L 63/1425 |
| 2020/0036750 A1* | 1/2020 | Bahnsen | H04L 63/1416 |
| 2020/0067861 A1* | 2/2020 | Leddy | G06F 21/6245 |
| 2020/0092325 A1* | 3/2020 | Kolingivadi | H04L 51/42 |
| 2020/0106791 A1* | 4/2020 | Bagnall | H04L 61/4511 |
| 2020/0267183 A1* | 8/2020 | Vishwanath | H04L 63/1483 |
| 2020/0404000 A1* | 12/2020 | Hayes | H04L 51/08 |

* cited by examiner

| Finding Types | Findings | Scores |
|---|---|---|
| Attachment 510 | Editable docs contain image 530 | 1 |
| | Editable docs contain embedded resources 532 | 3 |
| | Editable docs contain links 534 | 2 |
| | Editable docs macros 535 | malicious |
| | PDFs contain javascript 536 | malicious |
| | PDFs contain links 538 | 2 |
| | PDFs contain image 540 | 1 |
| | PDFs Encrypted 542 | malicious |
| | PDFs contain no text 544 | malicious |
| | PDFs contain little text 546 | 1 |
| | PDFs contain text with links 548 | 1 |
| | PDFs contain text length less than binary length 550 | 2 |
| | Contain mostly links 552 | malicious |
| | File extension 554 | 2 |
| | Executable 556 | 3 |
| | Encrypted zip 558 | malicious |
| Domain 512 | Domain registered with disposable email 560 | 2 |
| | DomainTools risk score between 50 and 75 562 | 2 |
| | DomainTools risk score greater than 75 564 | malicious |
| | Email address matching disposable domain service 566 | 1 |
| | Shortened domain 568 | 5 |
| | Registered within 7 days 570 | malicious |
| | Registered between 7 and 30 days 572 | 2 |
| VIP 514 | VIP name/email 574 | malicious |
| | VIP account name 576 | 2 |
| Binary stream 516 | Very interesting content type 580 | malicious |
| | Interesting content type 582 | 2 |
| Keyword 518 | Predetermined keywords 584 | malicious |
| | Predetermined DEV keywords 586 | malicious |
| Analysis using third party tools 520 | Bluecost classification as malicious 590 | malicious |
| | Bluecoat classification as suspicious 592 | 2 |
| | VirusTotal score 594 | malicious |
| Body 522 | Link to file with suspicious extension 523 | malicious |
| | Misleading hyperlink 525 | malicious |
| | Character type 526 | 2 |
| | Short text body with attachment 527 | malicious |
| Header 524 | Missing in-reply-to field in header 528 | 3 |

ANALYSIS OF POTENTIALLY MALICIOUS EMAILS

CROSS-REFERENCE TO RELATED APPLICATIONS

This application claims the benefit of U.S. Provisional Application Ser. No. 62/926,209, filed Oct. 25, 2019. The disclosure of the prior application is considered part of (and is incorporated by reference in) the disclosure of this application.

TECHNICAL FIELD

This document generally relates to a technology for analyzing potentially malicious emails.

BACKGROUND

Phishing is a type of online scam where attackers send emails that appear to be from legitimate senders but designed to steal user data, such as login credentials, credit card numbers, social security numbers, and other sensitive information. It may occur when an attacker, masquerading as a trusted entity, deceives a victim to open an email, instant message, or text message. The recipient may be tricked into clicking a malicious link, which can lead to the installation of malware, the freezing of the system as part of a ransomware attack or the revealing of sensitive information. Such attacks can cause devastating results, such as unauthorized purchases, the stealing of funds, or identity theft. Phishing attacks are becoming more sophisticated and harder to detect, especially among a massive number of emails delivered to each user daily.

SUMMARY

Some embodiments described herein include a system for automatically analyzing emails that have been flagged as being potentially malicious (e.g., phishing attempts) to determine whether the permit or block the email.

The system can provide a user interface that allows end users to report emails as potential threats. Once an email is flagged by a user, the system can use a scoring framework to determine whether the email is part of a phishing attempt. For example, a set of rules are provided, and points are awarded to the email based on which of a set of rules are satisfied for the email. An email that exceeds a scoring threshold can be identified as a phishing attempt for potential evaluation, and can be routed to a security analyst for further analysis and process. The security analyst can finally categorize the email into two or more different threat levels. In addition, after a predetermined period of time, the system can rerun analysis of emails which have not been identified as phishing attempts, such as emails which do not exceed the scoring threshold, and determine if such emails now exceed the scoring threshold. This may happen because external sources, rules, and other factors which are leveraged can be updated continuously so that emails that were considered safe can now be marked suspicious or malicious.

Various factors can be considered to determine the rules for evaluating potential phishing attempts. For example, the rules can be created based on header fields, the age of domain from which email addresses were sent, the level of seniority for email recipients relative to the type of domain from which the email originated (e.g., a private email address sent to a CEO of a big corporation), types and numbers of attachments to the email, macros, whitelisting, etc.

The system can generate a report once an email exceeds the scoring threshold. The report can be sent to a security analyst for further analysis or process. The report can include the information about the email, such as header fields, findings about the email (e.g., the rules satisfied for the email), screenshots of the email, attachments on the email, etc.

Particular embodiments described herein include a computer-implemented method for automatically analyzing a potentially malicious email. The method may include parsing an email by converting the email into scannable objects, and scanning the objects to collect findings about the email, checking the email against a whitelist, calculating a score of the email based on a phishing rule, and determining the email to be a malicious email if the score exceeds a threshold value. The score can be calculated by assigning item scores to the findings, respectively, based on the phishing rule, and calculating the score being a total of the item scores.

In some implementations, the system can optionally include one or more of the following features. The phishing rule may define first items that categorize emails as malicious, and the method may further include categorizing the email as the malicious email if the findings include one or more of the first items from the phishing rule. The whitelist may define second items that categorize emails as benign, and the method may further include categorizing the email as a benign email if the findings include one or more of the second items from the whitelist. The method may further include determining the email as a benign email if the score does not exceed the threshold value, and storing the benign email in a database. The method may further include updating the whitelist, and updating the phishing rule. The method may further include checking the benign email against the whitelist, calculating a second score of the benign email based on the phishing rule, and determining the email to be a malicious email if the second score exceeds the threshold value. The second score can be calculated by assigning second item scores to the findings, respectively, based on the phishing rule, and calculating the second score being a total of the second item scores. The method may further include receiving a user input indicative of the email being potentially malicious, storing the email in a predetermined database, and scanning the predetermined database to obtain the email. Receiving a user input may include generating a user interface selectable by a user to indicate that the email is potentially malicious. The scannable objects may include text objects and binary objects. The method may further include generating a report in a form of email, and transmitting the report to a security analyst computing device. The report may include an email subject, a list of attachments, the findings, the item scores, and the score.

Particular embodiments described herein include a server including a data processing apparatus, and a memory device storing instructions that when executed by the data processing apparatus cause the server to perform operations including parsing an email by converting the email into scannable objects, scanning the objects to collect findings about the email, checking the email against a whitelist, calculating a score of the email based on a phishing rule, and determining the email to be a malicious email if the score exceeds a threshold value. The score of the email can be calculated by assigning item scores to the findings, respectively, based on the phishing rule, and calculating the score being a total of the item scores.

In some implementations, the system can optionally include one or more of the following features. The phishing rule may define first items that categorize emails as malicious, and the operations may further include categorizing the email as the malicious email if the findings include one or more of the first items from the phishing rule. The whitelist may define second items that categorize emails as benign, and the operations may further include categorizing the email as a benign email if the findings include one or more of the second items from the whitelist. The operations may further include determining the email as a benign email if the score does not exceed the threshold value, and storing the benign email in a database. The operations may further include updating the whitelist, and updating the phishing rule. The operations may further include checking the benign email against the whitelist, calculating a second score of the benign email based on the phishing rule, and determining the email to be a malicious email if the second score exceeds the threshold value. The second score can be calculated by assigning second item scores to the findings, respectively, based on the phishing rule, and calculating the second score being a total of the second item scores. The operations may further include receiving a user input indicative of the email being potentially malicious, storing the email in a predetermined database, and scanning the predetermined database to obtain the email. Receiving a user input may include generating a user interface selectable by a user to indicate that the email is potentially malicious. The operations may further include generating a report in a form of email, and transmitting the report to a security analyst computing device. The report may include an email subject, a list of attachments, the findings, the item scores, and the score.

Particular embodiments described herein include a non-transitory computer-readable medium having stored therein a program for causing a computer to execute a process of analyzing a potentially malicious email. The process may include receiving a user input indicative of the email being potentially malicious, storing the email in a predetermined database, scanning the predetermined database to obtain the email, parsing an email by converting the email into scannable objects, scanning the objects to collect findings about the email, checking the email against a whitelist, calculating a score of the email based on a phishing rule by assigning item scores to the findings, respectively, based on the phishing rule, calculating the score being a total of the item scores, determining the email to be a malicious email if the score exceeds a threshold value, generating a report in a form of email, the report including an email subject, a list of attachments, the findings, the item scores, and the score, and transmitting the report to a security analyst computing device.

The devices, system, and techniques described herein may provide one or more of the following advantages. Some embodiments described herein include a system for automatically identifying and analyzing potentially-phishing emails from a vast number of incoming emails in fast, efficient, and reliable matters by using a scoring framework which can categorize the emails into different levels of threat, such as malicious and benign categories. Further, the system provides algorithms designed to thoroughly parse and review the content and/or format of an email, thereby improving analysis of potential phishing attempts. Moreover, the system provides detailed, but concise and organized reporting of emails which are determined to be malicious, thereby enabling security analysts to investigate emails efficiently. Further, the system can support for scanning multiple folders into which emails are categorized and stored by different levels of threat, and further support for different actions for the emails in each of the multiple folders, thereby making analysis of multiple emails more efficient.

The details of one or more implementations are set forth in the accompanying drawings and the description below. Other features and advantages will be apparent from the description and drawings, and from the claims.

BRIEF DESCRIPTION OF THE DRAWINGS

FIG. 5 illustrates example phishing rules.

FIG. 6B illustrates a part of the report of FIG. 6A.

DETAILED DESCRIPTION OF ILLUSTRATIVE EMBODIMENTS

Figure 1:
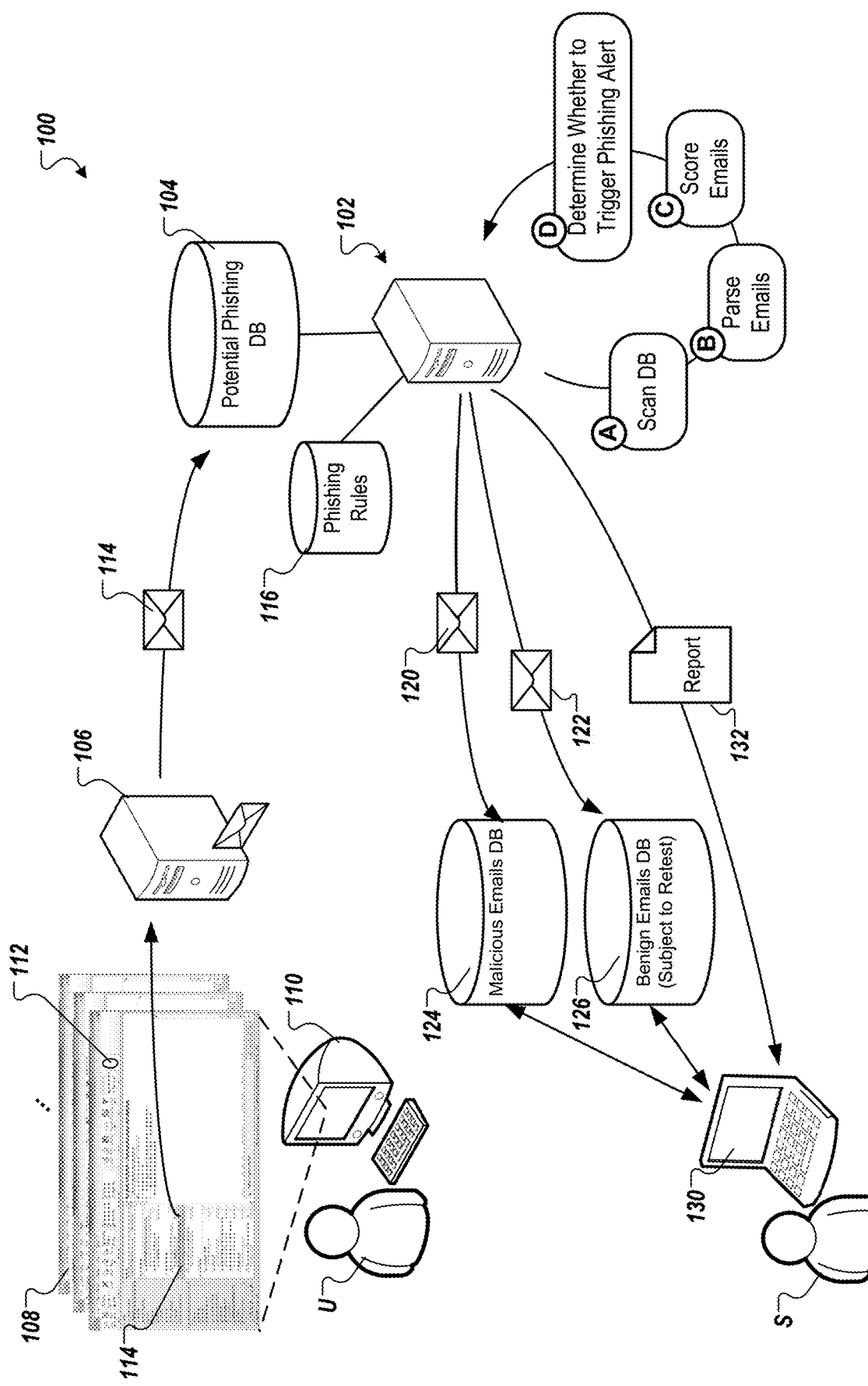
FIG. 1 is a block diagram of an example system for analyzing potential phishing attacks.

FIG. 1 is a block diagram of an example system 100 for analyzing potentially malicious emails (e.g., potential phishing attacks). The system 100 includes a phishing analysis server 102 configured to analyze emails, such as emails flagged as potential phishing attacks, to determine whether the emails can be actually malicious or suspicious and may need further investigation.

The system 100 can include a database 104 configured to store emails which are to be parsed by the phishing analysis server 102. The database 104 can store emails which are identified as potential phishing attempts. For example, the system 100 includes a mail server 106 configured to manage emails for a user U. A user U can send, receive, and manage emails using an email application 108 running on a user computing device 110. The email application 108 can provide a user interface 112, such as a control element (e.g., a button), to allow a user to flag an email that appears to be phishing or otherwise suspicious. When an email 114 is identified to be potentially phishing or suspicious by a user via the user interface 112 of the email application 108, the mail server 106 can save the email 114 into the potential phishing database 104 for automatic analysis.

The system 100 can include a database for phishing rules 116. The phishing analysis server 102 can analyze emails based on the phishing rules 116 and determine whether the emails are actually phishing or malicious. The phishing rules 116 can be updated over time to reflect any change in email security circumstances.

The phishing analysis server 102 can operate to scan the potential phishing database 104 to identify one or more emails to analyze (Step A). The phishing analysis server 102 can parse each email to find a variety of aspects of the email (Step B). For example, the phishing analysis server 102 can analyze a header and a body (including attachments) of each email and obtain a variety of findings about the email. An email header includes routing information of a message, including sender, recipient, data, subject, etc. Some headers are mandatory, such as the FROM, TO and DATE headers. Others are optional but commonly used, such as SUBJECT, CC and BCC. Other headers include sending and receiving time stamps (e.g., date/time) of mail transfer agents that have received and sent messages. An email body is a main part of an email message and can contain the message's text, images, attachments, and other data. The phishing analysis server 102 can investigate a variety of aspects of each email from the header and body of the email, and collect items (e.g., findings) which can be used to determine whether the email is malicious (e.g., phishing attempt).

The phishing analysis server 102 can generate a score that represents a level of phishing threat of each email (Step C). The phishing analysis server 102 can use the phishing rules 116 to assign a score (e.g., an item score) for each of the items collected about the email. In some implementations, a total of such items scores can be used as a score of the email that indicates how malicious the email is (e.g., the level of phishing threat of the email). In addition or alternatively, the phishing rules 116 can include rules that can categorize an email as malicious (e.g., phishing) regardless of the scores of items collected from the investigation of the email.

The phishing analysis server 102 can determine whether to trigger a phishing alert (Step D). The phishing analysis server 102 can determine that the score of an email exceeds a threshold value, and/or that an email is found categorically as malicious based on the phishing rules 116. The phishing analysis server 102 can generate an alert for a security analyst based on such determination. A phishing alert can be in various forms, such as emails, text messages, push notification, etc.

The phishing analysis server 102 can categorize emails into malicious emails 120 and benign emails 122, and store them into a malicious emails database 124 and a benign emails database 126, respectively. A security analyst S can access the databases 124 and 126 to retrieve the emails 120 and 122 that have been analyzed by the phishing analysis server 102. As described herein, the benign emails 122 in the benign emails database 126 can be retested at predetermined schedules to determine whether the benign emails are now considered to be malicious.

The phishing analysis server 102 can transmit a report 132 that summarizes the investigation of an email. The report 132 can include information about the items (e.g., findings) about the email that has been parsed and analyzed by the phishing analysis server 102. The report 132 can be formatted (e.g., in an email format) such that a security analyst S can easily read and understand the result of the analysis of an email.

Figure 2:
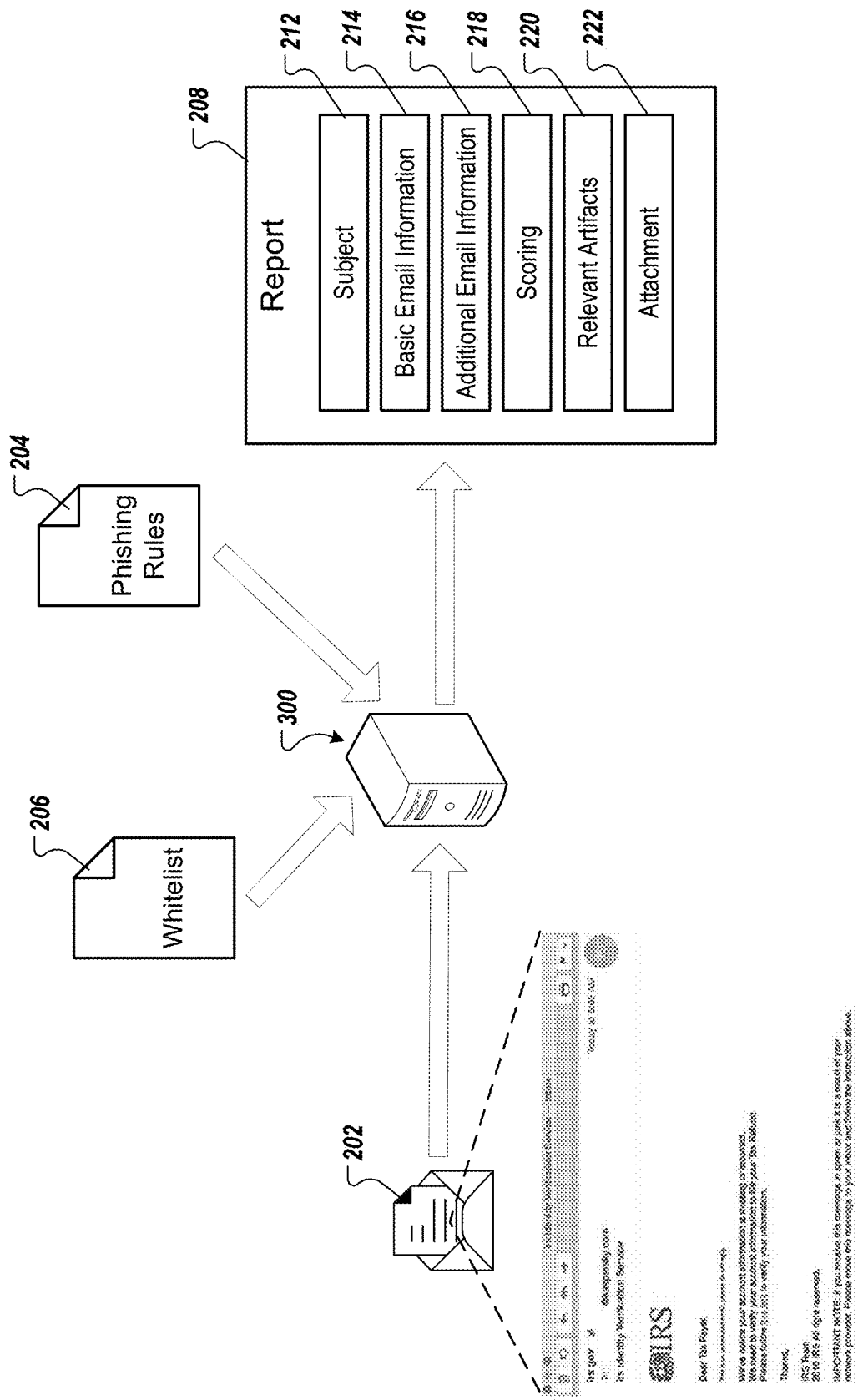
FIG. 2 is a block diagram of an example phishing analysis system.

FIG. 2 is a block diagram of an example phishing analysis system 200. The phishing analysis system 200 can be used to implement the phishing analysis server 102 and/or at least part of the system 100 of FIG. 1. The phishing analysis system 200 can parse an email 202 and identify various pieces of information from the email 202. In some implementations, the phishing analysis system 200 can retrieve a whitelist 206 that includes requirements for categorically preventing an email from being identified as malicious (or requirements for categorically identifying an email as benign).

The phishing analysis system 200 can use phishing rules 204 to evaluate the email 202. The phishing rules 204 can include, or can be used for, the phishing rules 114 in FIG. 1. In some implementations, the phishing rules 204 are designed to score a level of threat of an email by, for example, evaluating each piece of information (e.g., items or findings) parsed from the email. For example, the phishing rules 204 include rules to assign a score to each of the items identified from an email, and a total score which sums up some or all of the scores for the items can be used to determine a level of threat of the email. The total score of the email can be used as indication of whether the email may be actually malicious (e.g., phishing) and thus may need further investigation. For example, if the total score of the email exceeds a predetermined threshold value, the email can be considered to be malicious (or phishing) so that a security analyst can review it for final determination. If the total score of the email does not exceed the threshold value, the email can be considered to be benign. In addition or alternatively, a plurality of threshold values can be provided so that the email can be classified into three or more categories of trustworthiness, such as benign, low chance of phishing, medium chance of phishing, high chance of phishing, and absolutely phishing.

The phishing analysis system 200 can generate a report 208, which can be transmitted to a security analysis or other interested people for further investigation. The report 208 can be used to implement the report 132 and/or can be used as an example form of alert as described with reference to FIG. 1.

The report 208 can be of various formats, such as an email, a text message, a push notification, and other suitable forms. The report 208 can include various pieces of information that are usable to evaluate the email. For example, the report 208 includes information about a subject 212, basic email information 214, additional email information 216, scoring information 218, relevant artifacts 220, and attachment 222. The subject 212 of the report 208 include information that can summarize the report 208 in a concise template. In some implementations, the basic email information 214, the additional email information 216, the scoring information 218, the relevant artifacts 220 can be arranged in a main body of the report 208. The main body of the report 208 can show a summary of the analyzed email, the true-positive findings, a summary of the artifacts found, and other desired information.

The basic email information 214 includes a summary of the email that has been analyzed. The additional email information 216 can include information that can add extra context about the scanned email. The additional email information 216 can be obtained from the email header or other available sources associated with the email.

The scoring information 218 can include a total score of the scanned email. The total score can be calculated by summing the scores for the items (e.g., findings) parsed from the emails. The total score may not have an upper limit. Alternatively, the total score can be scaled to a predetermined range or percentage. In addition or alternatively, the scoring information 218 can include a list of scores of respective items (e.g., findings) identified from the email. The scoring information 218 can include a list of scores of only items that have been identified as suspicious (e.g., items having scores greater than zero). In the scoring information 218, any item having a score exceeding a predetermined value (e.g., 4 or greater) can be marked as "malicious" to draw more attention to it. For each item, the scoring information 218 can include information representative of the item, and the score of the item. The information can be presented as a human readable string. In addition, the scoring information 218 can provide a map of extra information that may give context to the finding.

The relevant artifacts 220 can show a summary of data and objects extracted from the email and its attachments.

The relevant artifacts 220 may exclude things that are whitelisted to reduce the amount of noise. The links, domains, and other clickable objects can be re-formatted so that an email application (e.g., Outlook) does not recognize them as clickable.

The attachment 222 in the report 208 is configured to summarize details of the attachments included in the email. The attachment 222 can be generated as one or more text files and/or binary files which describe specifics of actual attachments to the email. In addition or alternatively, the attachment 222 can include the actual attachments to the email.

Figure 3:
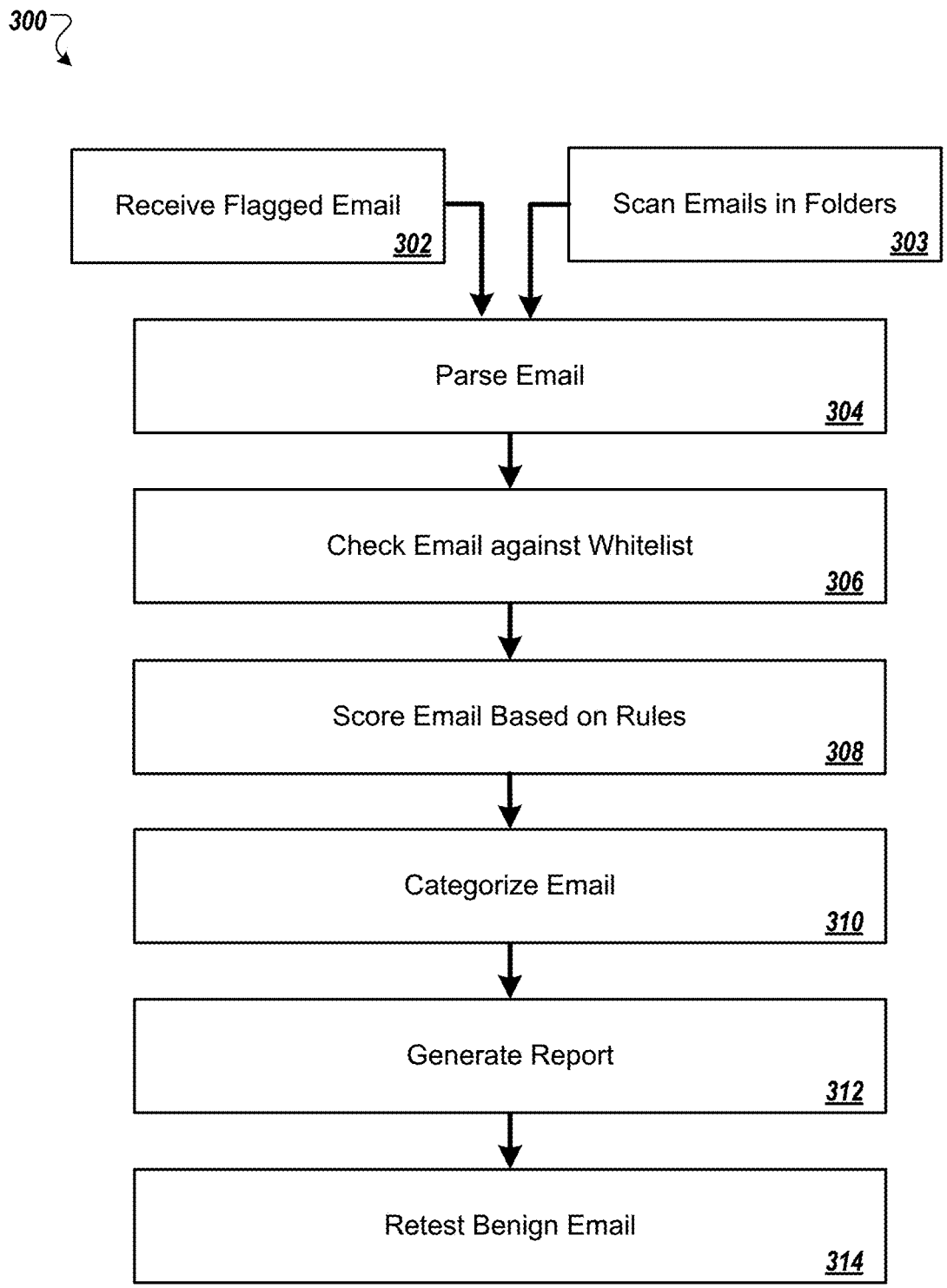
FIG. 3 is a flowchart of an example method for analyzing emails.

FIG. 3 is a flowchart of an example method 300 of analyzing emails, such as emails flagged as potentially phishing attempts. The method 300 can be at least partially implemented by one or more computing devices or systems, such as the phishing analysis server 102 or the phishing analysis system 200. Although the method 300 is primarily illustrated as performed by the phishing analysis system 200, it is understood that the phishing analysis server 102 or other computing devices or systems can at least partially perform the method 300 with or without communication with other devices or systems.

The method 300 can include process 302 of receiving an email that has been flagged as potentially phishing (e.g., malicious or suspicious). In some implementations, a recipient of an email can report the email to the system by, for example, flagging the email via a user interface (e.g., the user interface 112 in FIG. 1) provided in an email application (e.g., Microsoft Outlook). Alternatively, an email can be flagged by other users, such as security analysts. In addition or alternatively, an email can be flagged automatically by, for example, an email application running on the recipient's computing device.

In addition or alternatively, the method 300 can include process 303 of scanning emails in predefined email folders. For example, the process 303 can include scanning a predetermined number of new emails (e.g., first 25 emails) in each of predefined email folders (e.g., Outlook folders) that have been created by users or security analysts. Such scanned emails in each folder are subject to further analysis in subsequent processes.

The method 300 can include process 304 of parsing the email. For example, an email, such as the flagged email, can be parsed to collect a variety of findings from the email, such as information found from the email header and body (including attachments).

The method 300 can include process 306 of checking the email from a whitelist, such as the whitelist 206 in FIG. 2. The whitelist 206 provides data usable to categorize the email into a non-malicious email (e.g., benign) regardless of the findings or other considerations about the email. The whitelist 206 can be updated over time. An example of the whitelist 206 can include one or more predetermined email addresses, predetermined domains, emails with predetermined patterns or attributes of subjects, headers, bodies, attachments, contents, or other data associated with emails.

Referring still to FIG. 3, the method 300 can include process 308 of scoring the email based on rules, such as the phishing rules 204. A score of the email is configured to represent the degree of trustworthiness (or the degree of threat or malice) of the email, or to represent how malicious or phishing the email is. In some implementations, a total score of the email is calculated by assigning scores to respective findings parsed from the email based on the rules, and then aggregating all the scores. In addition or alternatively, the rules can include rules that cause an email to be categorized as malicious (e.g., phishing) if a predetermined finding is detected, or if a score of a predetermined finding exceeds a threshold value, regardless of other findings or the scores thereof. The phishing rules can be updated over time. An example of the rules is further described herein, for example with reference to FIG. 5.

The method 300 can include process 310 of categorizing the email. The email can be categorized based at least in part on the score calculated in the process 308. In some implementations, the email can be identified as either malicious or benign, depending on whether a total score exceeds a predetermined threshold value. For example, if the total score of the email exceeds a predetermined threshold value, the email is categorized as a phishing or malicious email. If not, the email is categorized as a benign email.

In addition or alternatively, if a predetermined finding is detected or if a score of a predetermined finding exceeds a threshold value, the email can be categorized as a phishing or malicious email regardless of other findings or the scores thereof.

The method 300 can include process 312 of generating a report, such as the report 208 in FIG. 2. The report can be transmitted to a computing device so that a security analyst or other interested people can review and further investigate the email. An example of the report is further described herein, for example with reference to FIGS. 6A-6C.

The method 300 can include process 314 of retesting an email that has been previously parsed and identified as a benign email. The retesting of the email can be performed by repeating at least some of the processes of the method 300, such as the processes 306, 308, 310, and 312. As described herein, because the rules and/or external sources may be updated over time, an email which had a score not exceeding a threshold value can now have a score exceeding the threshold, or vice versa.

In some implementations, the retesting can be performed after the system has been launched and run to analyze a number of email for a period of time, and after the users and analysts become used to the system, thereby permitting the system to be updated to handle false-positives better. After such a period of time of initial operation, the attributes of external lookups (e.g., Bluecoat category) can change from benign to malicious or vice versa, and the rules and/or the whitelists can then be updated to reflect such change.

The process 314 can include scanning emails from the benign emails database 126 and checking them against the whitelist, scoring them based on the phishing rules, and generating reports, as described herein. In addition, parsing the emails can be rerun if necessary. The process 314 can be performed at predetermined intervals (e.g., every hour), or at predetermined schedules (e.g., one hour, 3 hours, 6 hours, a day, etc. after the emails have been stored in the benign emails database 126). In some implementations, the emails can be moved from the benign emails database 126 to another database (e.g., a false-positive folder) according to the predetermined intervals or schedules. For example, after a preset period of time (e.g., 3 hours) after an email was saved in the benign emails database 126, the email can be moved to a false-positive folder, and the process 314 is performed against the emails in the false-positive folder while newer emails are still stored in the benign emails database 126.

Figure 4:
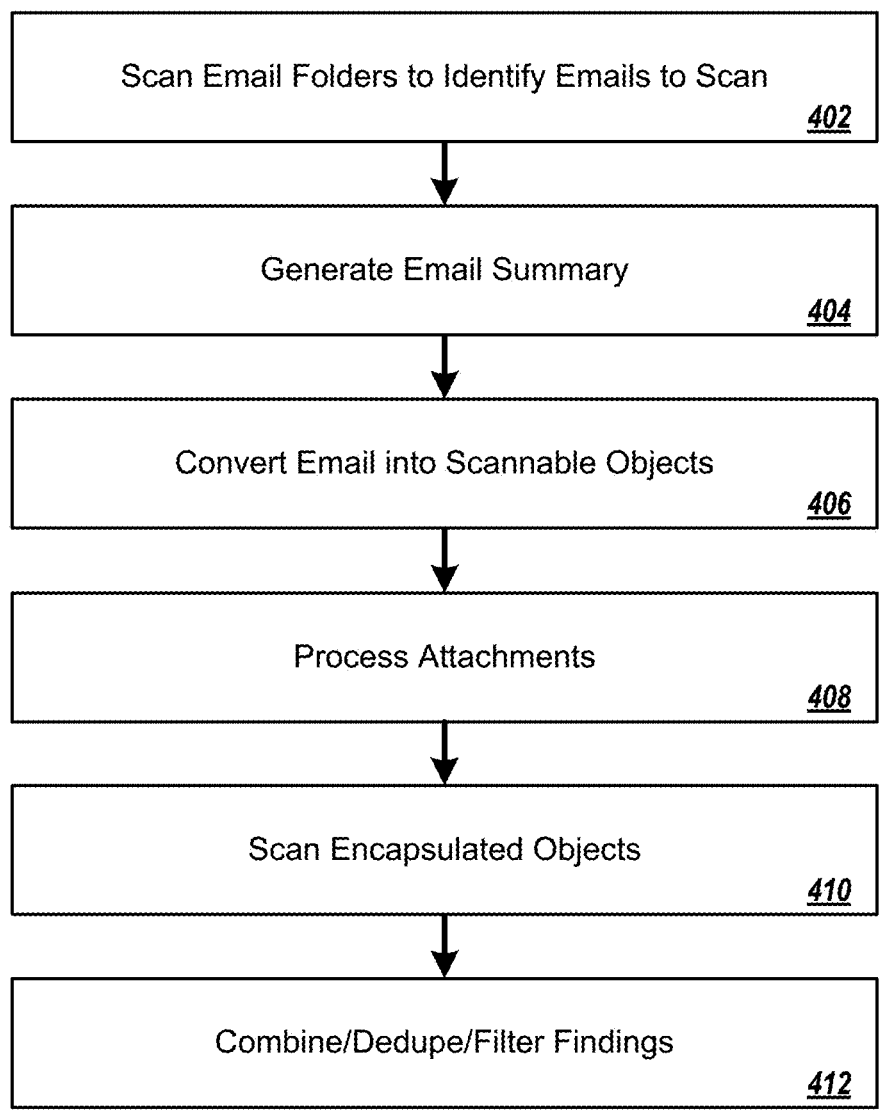
FIG. 4 is a flow chart of an example method for parsing an email.

FIG. 4 is a flow chart of an example method 400 for parsing an email, such as an email flagged as potentially phishing attempts. The method 400 can be used to perform the process 304 in FIG. 3. The method 400 can be at least partially implemented by one or more computing devices or systems, such as the phishing analysis server 102 or the phishing analysis system 200. Although the method 400 is primarily illustrated as performed by the phishing analysis system 200, it is understood that the phishing analysis server 102 or other computing devices or systems can at least partially perform the method 400 with or without communication with other devices or systems.

The method 400 can include process 402 of scanning one or more email folders to identify an email to scan. For example, the system can scan one or more predefined email folders, such as folders of email applications (e.g., predefined Outlook folders), and determine if there are any new emails to scan. The predefined email folders can include a folder configured to save emails that have been flagged or reported by recipients of the emails. In addition or alternatively, the predefined email folders can include folders that automatically save emails subject to scan. The system can perform the scanning process periodically (e.g., every 3 seconds) and/or according to a predetermined schedule.

The system can operate to scan a predetermined number of first emails (e.g., first 25 emails) from each of the email folders. The system can scan the emails one by one. For example calls to exchange can be executed in a single-threaded manner so each email is loaded one at a time, blocking between each load. The system can also download attachments to each email. In some implementations, the system can download predetermined types of attachments, such as attachments which could recursively found inside other attachments. The system can download each of the emails including the raw bytes of the file.

The method 400 can include process 404 of generating an email summary. The email summary can include information obtained from parsing the header of the email. In addition or alternatively, the email summary can include information collected from the body or other sources relevant to the email. When an email that has been flagged or reported is parsed, the email summary is generated for the flagged email. When a predefined email folder is scanned to find one or more new emails, the first email identified from the email folder is used to generate the email summary. In some implementations, raw bytes of the email can be stored and then included in the report, as described herein.

The method 400 can include process 406 of converting the email into scannable objects. The system can scan each email and turn it into a stream of objects (e.g., items, data, files, etc.) to scan. For example, the system can convert the body of the email into a text or HTML email object depending on what type of email was sent. In addition or alternatively, the system can scan the header of the email. In addition or alternatively, the system can scan attachments in the email. The scanning of the attachments can be performed recursively.

The method 400 can include process 408 of processing attachments in the email. For example, if the attachment is text only, the system can turn the attachment into a text object. If the attachment ends in ".eml" or has the content type set as "rfc822," the attachment can be parsed as an email attachment (e.g., from the raw bytes). If none of the above is the case, the attachment is parsed as a file.

The method 400 can include process 410 of scanning encapsulated objects to collect findings (e.g., items, strings, data, etc.). For example, the process 410 can include scanning text objects and binary objects.

For text objects, the system can look for any ipv4 or ipv6 string, which may include ipv4 that is embedded inside a Teredo address or other ipv6 encapsulation techniques. In addition or alternatively, the system can look for email addresses. In addition or alternatively, the system can look for domains and/or links using various techniques. For example, the system can use a generated regex that performs one or more of the followings:

Skips any smtp.mail(from|to)=prefix;
Looks for an optional known prefix+://;
Look for an optional user/pass;
Looks for either an ip address or an optional number of subdomains plus a known top level domain;
Looks for optional port info;
Grabs the optional "path parts"/params; and
Ensures to stop at a word boundary.

In some implementations, if there is no proto or path parts and it isn't an IP and the length of the first subdomain is very short, the system rejects it as a link unless it ends in a predetermined domain name extension, such as .com, org, gov, info, net, or edu. In such situations that the system find too many false positives, this can help eliminating such false positives. The system can combine those with the domains of all of the emails found.

In addition or alternatively, the system can determine if the text contains any VIP name, email, or domain ID. For example, a list of VIPs can include users in managerial positions, such as directors or higher. For their name, the system can look for [last_name, first_name], [mr/mrs/miss+last name], [first_name.last_name], [first_name [-_]+last_name], their [full name], and/or other suitable variations. In addition or alternatively, the system can look to see if any of the characters in the text are Cyrillic or Han. In addition or alternatively, the system can save a text as an "interesting string" if requested.

For binary objects, the system can calculate the md5, sha1, & sha256 hash of the byte string (for example, in parallel). Next, the system can look up the magic bytes of the byte array. Then, the system can determine if what was found is in a set of suspicious and malicious content types that have been predefined. Suspicious content types can be assigned a predetermined score (e.g., 2). Malicious content types can be assigned a predetermined score (e.g., 100) or categorically determined as malicious or phishing. Examples of the malicious content types and the suspicious content types include:

1. Malicious
    a. Content Type
        i. APPLICATION
        ii. CAB
        iii. DMG
        iv. JAVA_APPLET
        v. RAR
        vi. SHARED_LIBRARY
    b. MIME Type
        i. application/x-dosexec
        ii. application/x-sharedlib
        iii. application/x-shockwave-flash
        iv. application/x-executable
        v. application/x-rpm
        vi. application/x-java-applet
2. Suspicious
    a. Content Type
        i. ACE
        ii. ARC
        iii. BINHEX
        iv. BITTORRENT
        v. BZ
        vi. BZIP2
        vii. CFS
        viii. CHM ix. COMPRESS
x. CPIO
xi. DEBIAN_PACKAGE
xii. DOCM
xiii. DOTM
xiv. DOTX
xv. ECMA_SCRIPT
xvi. FLASH
xvii. FLASH_VIDEO
xviii. FONT_OBJECT
xix. GZIP
xx. ISO_9660
xxi. JAVASCRIPT
xxii. JAVA_ARCHIVE
xxiii. JAVA_CLASS
xxiv. JAVA_SERIALIZED
xxv. LHA
xxvi. LNK
xxvii. MICROSOFT_ACCESS
xxviii. MICROSOFT_EXCEL
xxix. MICROSOFT_EXCEL_XML
xxx. MICROSOFT_MONEY
xxxi. MICROSOFT_OFFICE
xxxii. MICROSOFT_POWERPOINT
xxxiii. MICROSOFT_POWERPOINT_XML
xxxiv. MICROSOFT_WORD
xxxv. MICROSOFTWORD_XML
xxxvi. MICROSOFT_WORKS
xxxvii. MICROSOFT_WRITE
xxxviii. OPENDOCUMENT_CHART
xxxix. OPENDOCUMENT_CHART_TEMPLATE
xl. OPENDOCUMENT_DATABASE
xli. OPENDOCUMENT_FORMULA
xlii. OPENDOCUMENT_FORMULA_TEMPLATE
xliii. OPENDOCUMENT_GRAPHICS
xliv. OPENDOCUMENT_GRAPHICS_TEMPLATE
xlv. OPENDOCUMENT_IMAGE
xlvi. OPENDOCUMENT_IMAGE_TEMPLATE
xlvii. OPENDOCUMENT_PRESENTATION
xlviii. OPENDOCUMENT_PRESENTATION_TEMPLATE
xlix. OPENDOCUMENT_SPREADSHEET
l. OPENDOCUMENT_SPREADSHEET_TEMPLATE
li. OPENDOCUMENT_TEXT
lii. OPENDOCUMENT_TEXT_MASTER
liii. OPENDOCUMENT_TEXT_TEMPLATE
liv. OPENDOCUMENT_TEXT_WEB
lv. PDF
lvi. PGP
lvii. POTX
lviii. PPSX
lix. PUB
lx. RTF
lxi. SEVEN_Z
lxii. SHELL_SCRIPT
lxiii. SLDX
lxiv. SQL
lxv. STUFFIT
lxvi. TAR
lxvii. WPL
lxviii. XLTX
lxix. XPS
lxx. ZIP
lxxi. ZOO b. MIME Type
i. application/pdf
ii. application/vnd.ms-excel
iii. application/vnd.oasis.opendocument.text
iv. application/vnd.openxmlformats-officedocument
v. application/vnd.openxmlformats-officedocument.presentationml.presentation
vi. application/vnd.openxmlformats-officedocument.spreadsheetml.sheet
vii. application/vnd.openxmlformats-officedocument.wordprocessingml.document
viii. application/x-7z-compressed
ix. application/x-arc
x. application/x-archive
xi. application/x-arj
xii. application/x-bittorrent
xiii. application/x-bzip2
xiv. application/x-compress
xv. application/x-cpio
xvi. application/x-dbm
xvii. application/x-debian-package
xviii. application/x-gzip
xix. application/x-lha
xx. application/x-ms-reader
xxi. application/x-msaccess
xxii. application/x-rar
xxiii. application/x-sc
xxiv. application/x-scribus
xxv. application/x-stuffit
xxvi. application/x-svr4-package
xxvii. application/x-tar # encoding: gnu
xxviii. application/x-tar # encoding: posix
xxix. application/x-zoo
xxx. application/zip In addition or alternatively, the process 410 can include scanning a header, a text email, HTML email, text objects, binary objects, Microsoft Office docs, and/or PDFs. Regarding a header, the system can scan each header value in as text. Regarding a text email, the system can scan an email body as text, scan headers, and look for odd characteristics in the subject.

Regarding an HTML email, the system can scan for all elements and pull out the href attributes and extract valid links. In addition, the system can check to see if the display text of an element is a link. If it is, the system can verify that the domain of the display text is the same as the actual link. If they're different, the system can flag it as malicious. Then, the system can scan the raw html as the text scanning described above. Next the system can parse all of the inline css and try to parse all of the selector texts as domains. This can help exclude what look like domains to the URL extraction regex, from the results and leave full links only. The system can scan all of the headers as the header scanning described above. The system can look for odd characteristics in the subject.

Regarding text objects, the system can scan such text objects as the text scanning described above, scan all of the headers (if any) as the header scanning described above, and look for odd characteristics of the subject. Regarding binary objects, the system can scan such binary objects as the binary scanning described above.

Regarding Office docs, the system can perform the same steps for Word, Excel, and Powerpoint. Binary Office docs (e.g., .doc vs .docx) may not be parsed as well due to library limitations. The system can pull out all valid hyperlink objects. The system can scan the text contents as the text scanning above and include it as an interesting string. The system can find any images and/or objects and include them as binaries. The system can extract all macros and include them as interesting strings. In some implementations, the system can mark the email as malicious.

Regarding PDFs, if the system attempts to parse a PDF doc but can't (e.g., due to the doc is encrypted or some permissions are blocking it), the system can flag the doc as malicious. Although there is a chance that such flagging is a false positive, a security analyst can further investigate to finalize the categorization.

The system can extract the text out of a PDF doc. In some implementations, the library can be used to make sure that if the pdf text is created by overlaying text boxes on top of each other then it shows the final output and not just the embedded strings in the pdf. The system can scan a PDF doc as the text scanning. The PDF doc can be scanned to identify an interesting string contained therein. If there is no or very little text, then the system can flag that since it probably indicates it's just a picture which is common in phishing so it's hard to scan. If the PDF contains a link, that's called out as an additional finding. If the PDF is mostly link, that also increases the score. If the length of the text is way less than the total size, then that might be an indicator that there's a bunch of binary streams in there so the system can flag that as well.

The system can collect scripts (e.g., Javascripts) from a PDF doc, and mark them as malicious and/or include them as interesting strings. Optionally, a security analyst can review a PDF doc and identify places of scripts that are missing. The system can scan a PDF doc as text scanning described above so that any domains, links, IPS, etc. in scripts can be pulled out.

The system can render each page of a PDF doc as an image and include in the binaries, thereby permitting a security analyst to review the PDF doc without actually opening it. In addition or alternatively, the system can extract all hyperlinks out of a PDF doc, similarly to the process of extracting scripts. In addition or alternatively, the system can extract file streams out of a PDF doc, and parse them as binary objects described above. In addition or alternatively, the system can extract embedded pictures in a PDF doc.

Referring still to FIG. 4, the method 400 can include process 412 of combining all findings parsed from the email, such as the findings collected from the processes 408 and 410. The process 412 can further include deduping the findings from the email. In addition or alternatively, the process 412 can include filtering the findings.

For example, the system can remove link-local addresses, site-local addresses, loopback, and other local IP types. In addition or alternatively, the system can remove internal IP ranges. In addition or alternatively, the system can remove any domains that are in a whitelisted domain. A whitelist of domains include internal and/or external domains which are considered safe. The whitelist of domains can be updated over time. Optionally, the system can lowercase all findings before performing lookups (e.g., scoring based on rules in the process 308).

When the email has been parsed in the method 400, a whitelist can be run against the email (e.g., the process 306 in FIG. 3). In some implementations, if the email should be whitelisted, the system can first verify that no IOC finding is matched (e.g., by checking all emails, IPS, domains, and hashes against known bad lists). If it did match, the system can flag the email malicious as described herein. If not, the system can move the email to a predetermined folder (e.g., the benign emails database 126 in FIG. 1 or a false-positive folder), and send a report (with a subject indicating that the email has been whitelisted). In this case, the system may skip the subsequent processes, such as scoring the email against the rule (e.g., the process 308).

When the email has been parsed in the method 400, several lookups can be performed on the strings (e.g., findings) that have been found (e.g., the process 308 in FIG. 3). Several tools can be used to perform such lookups, and if a tool has a cache defined, the system can be configured to not perform a lookup for the same string within that timeframe. By way of example, several aspects can be looked up, such as whether the age of the domain registration meets certain criteria, whether any known bad hash is found, etc. In further examples, one or more domain tools can be executed to determine one or more scores to be given to the email, and/or categorizing the email to be malicious, by identifying, for example, (1) a risk score (depending on a range of the risk score), (2) the age of the domain registration, (3) the characteristics of the domain registration (e.g., whether the domain was registered as a disposable email service, whether the domain was registered using emails from a predetermined list, whether the domain is found in predetermined categories (e.g., malicious categories (malicious outbound data, malicious sources, phishing, potentially unwanted software, scam/questionable/illegal, uncategorized, etc.), suspicious categories (adult/mature content, dynamic DNS host, extreme, file storage/sharing, hacking, spam, or otherwise suspicious))), and/or (4) attributes of any link contained in the email (e.g., linked to a link shortening service, whether the email includes a link that appears to point to a file with an extension that is not found from a predefined extensions list, etc.).

When the email has been parsed in the method 400 and the whitelist and/or lookups are performed against the email, all findings can be combined and deduped, and made into a report (e.g., the process 312 in FIG. 3). By way of example, the system can send the report (in different formats) to a local file and a search engine (e.g., Elasticsearch) for archival purposes. Depending on the configuration for the folder, the report can be sent or dropped and the email can be moved into the final destination folder (if configured to do so).

FIG. 5 illustrates example phishing rules 500, which can be used for the phishing rules 106 and 204. The phishing rules 500 can include finding types 502 to which one or more findings 504 are categorized. The phishing rules 500 assign scores to respective findings 504 to indicate the level of threat (malicious or phishing attempt) of such findings 504. The scores can be numerical values, such as equal to or greater than zero (0). In some implementations, the scores have no upper limit. Alternatively, the scores can have, or be scaled to, a predetermined range. In addition or alternatively, the scores can include non-numerical values, which classify emails into one or more categories. For example, one or more of the findings 504 can cause an email to be categorized into malicious without assigning a numerical value.

The finding types 502 can be associated with attachment 510, domain 512, VIP 514, binary stream 516, keyword 518, analysis of third-party tools 520, email body 522, and email header 524.

Regarding the attachment 510, an email can be assigned a predetermined score depending on whether the attachment contains an image (530, 540), an embedded resource (532), a link (534, 538), a macro (535), a script (536), no text (544), little text (546), a text with a link (548), a text length less than a binary length (550), and mostly links (552). In addition, a score is assigned based on whether the attachment is encrypted (542) or an encrypted compressed file (558). Further, a score is assigned depending on whether the attachment has a suspicious file extension (554) (e.g., an extension not included in a predefined extensions list which may include, for example, dll, doc, docb, docm, docx, dot, dotm, dotx, exe, hta, jar, msi, pdf, pot, potm, potx, ppam, pps, ppsm, ppsx, ppt, pptm, pptx, rar, sldm, sldx, wbk, xla, xlam, xll, xlm, xls, xlsb, xlsm, xlsx, xlt, xltm, xltx, and xlw) or an executable (556) (e.g., ".exe"). Scores can be different based on a type of the attachment, such as editable docs (e.g., Microsoft Word, Excel, and PowerPoint), PDFs, compressed files (e.g., Zip), etc.

Regarding the domain 512, a score depends on whether a domain is registered with a disposable email (560), scores provided by a domain tool (e.g., DomainTools) (562, 564), whether the email address matches a disposable domain service (566), whether the domain used is a shortened domain (568), and when the domain was registered (570, 572).

Regarding the VIP 514, a score depends on whether the email includes a VIP name and/or email (574), and a VIP account name (576).

Regarding the binary stream 516, a score depends on whether the email includes a binary stream with a very interesting content type (580) or an interesting content type (582).

Regarding the keyword 518, a score depends on whether the email contains one or more predetermined keywords (584, 586).

Regarding the analysis of third-party tools 520, a score is assigned based on the outcomes from one or more third-party tools, such as BlueCoat, VirusTotal, DomainTools (described regarding the domain 512), etc. For example, a score depends on Bluecoat's classification as "malicious" (590) or "suspicious" (592), VirusTotal's score (594), etc.

Regarding the email body 522, a score can depend on whether the email includes a link to a file with a suspicious extension (523), whether the email includes a misleading hyperlink (525), whether the email contains a suspicious character type (526), and whether the email contains a short text body with attachment (527).

Regarding the email header 524, a score can depend on whether the email misses an in-reply-to field in the header (528).

Figure 6A:
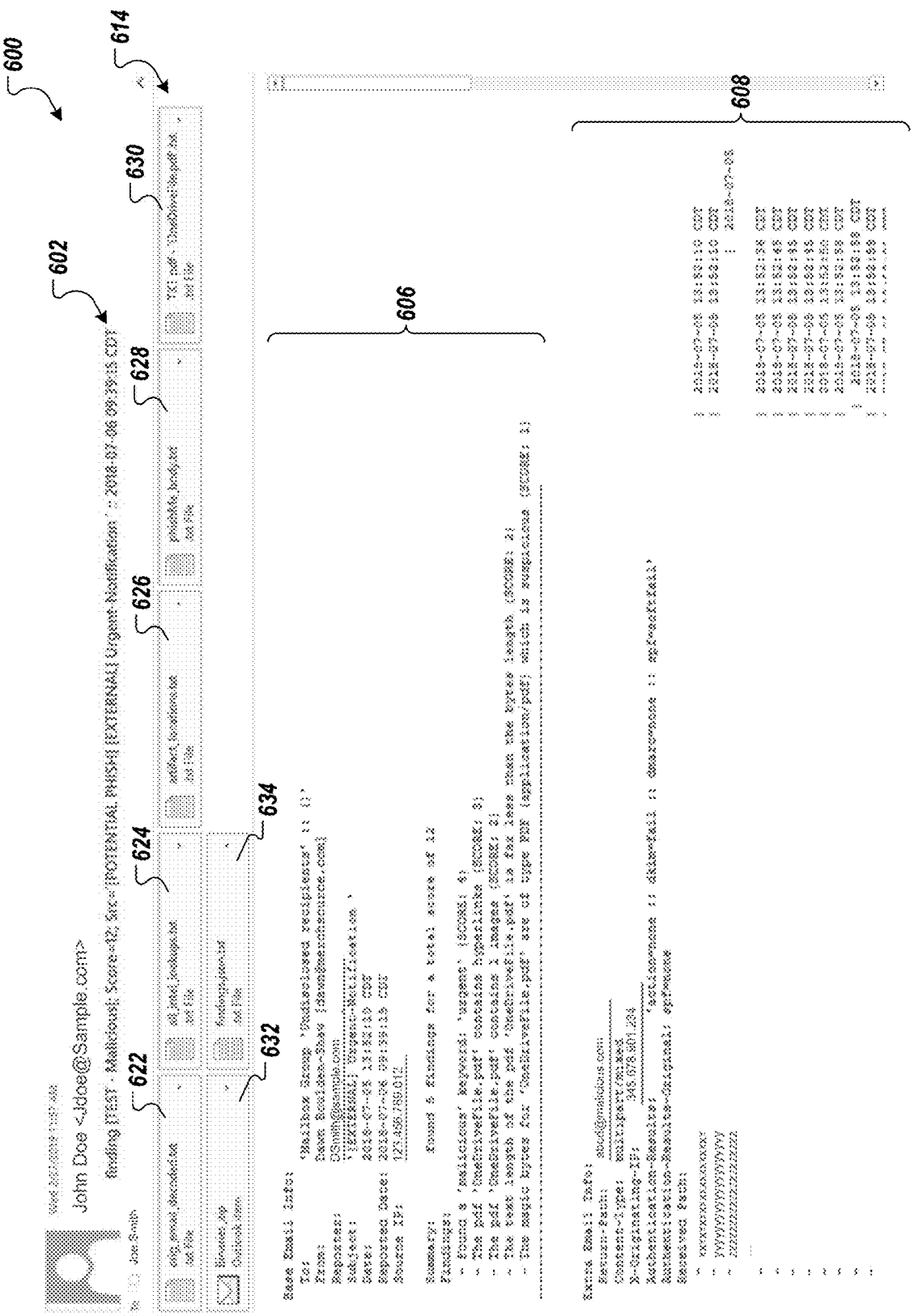
FIG. 6A illustrates a part of an example report.
Figure 6B:
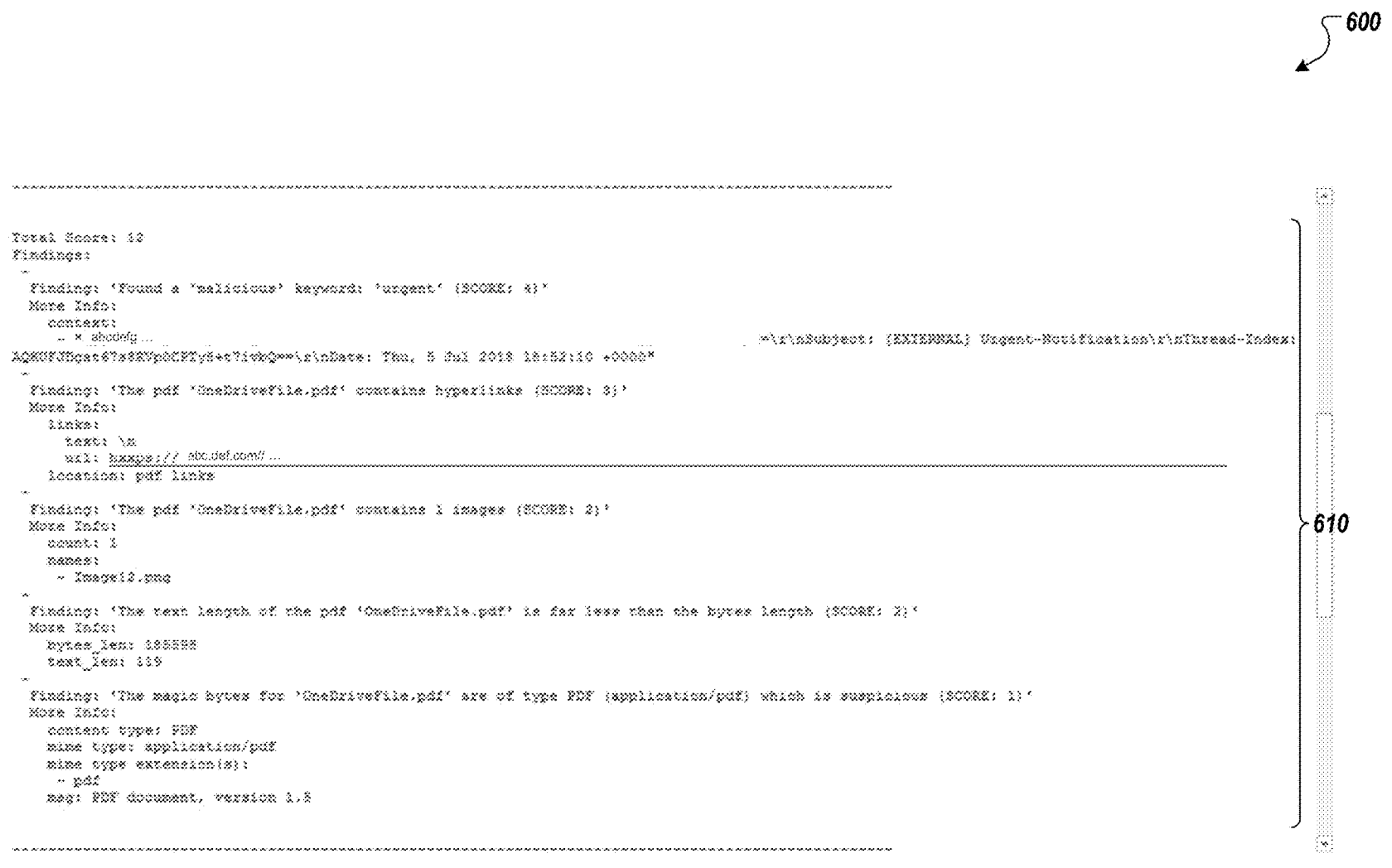
Figure 6C:
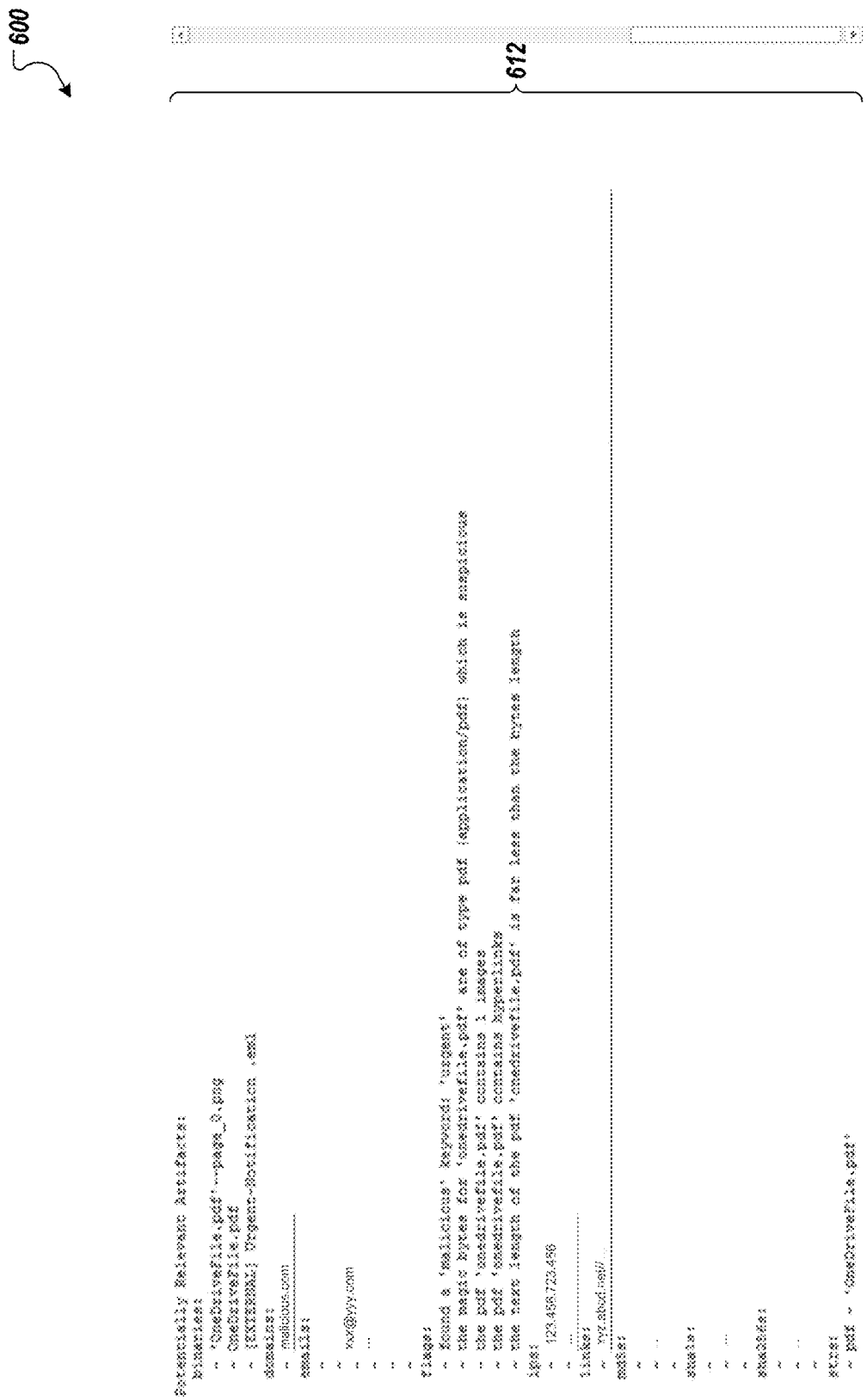
FIG. 6C illustrates a part of the report of FIG. 6A.

Referring to FIGS. 6A-6C, an example report 600 is illustrated. The report 600 can be used to implement the report 132, 208 in FIGS. 1 and 2. The report 600 can include an email subject 602, a main body 604, and a list of attachments 614. The main body 604 includes a base email information 606, an extra email information 608, scoring and findings 610, and relevant artifacts 612. The email subject 602, the base email information 606, the extra email information 608, the scoring and findings 610, the relevant artifacts 612, and the list of attachments 614 in the report 600 can be used to generate the subject 212, the basic email information 214, the additional email information 216, the scoring information 218, the relevant artifacts 220, and the attachments 222 of the report 208 in FIG. 2.

The email subject 602 of the report 600 can summarize the report 600 in a concise template. The format of the subject 600 makes it easy to write email application rules (e.g., Outlook rules) that match specific types of findings from the email.

The main body 604 of the report 600 can show a summary of the analyzed email, the true-positive findings, a summary of the artifacts found, and other desired information.

The base email information 606 includes a summary of the email that has been analyzed. The base email information 606 can include several fields. Examples of such fields include the recipient (To) of the email, the recipient to which a copy was sent (Cc), the recipient to which a copy was blindly sent (Bcc), the sender (From), the reporter who have reported or flagged the email as potentially phishing, the subject of the email, the date (when the email was originally sent or when it was delivered to a target inbox), the reported date (when the email was delivered to a security or when the email was reported by the original recipient), the source IP (the last external, non-target IP found in the received path), the summary (a high level summary of how many findings were collected along with a total score), the findings (a compact list of the findings collected), and an ID (an identifier usable for tracking between different systems). The base email information 606 can selectively include one or more of the fields, because not all of the fields are always available. When common fields such as "Subject" or "To" are missing, such fields can be identified as "-UNKNOWN-." In addition or alternatively, when fields are missing (e.g., less-common fields), they can be omitted from the report. In some implementations, if the recipient or sender fields contain too many entries (e.g., more than 15 entries), the total count may be listed instead of listing all the recipients or senders for readability. In this case, the full list of recipients or senders may be provided as an attachment to the report.

The extra email information 608 can include information that can add extra context about the scanned email. The extra email information 608 can be obtained from the email header or other available sources associated with the email. The extra email information 608 can include several fields. Examples of such fields include a return path (address(es) listed under the "Reply-To" header), a content type (the content type that the email is encoded in), X-Originating-IP && X-Mailgun-Sending-IP (the original IP address that the email was sent from; not the same as the "Sender IP" field in Ironport; the "Received Path" header can be referred to to determine the Sender IP), Authentication-Results && Authentication-Results-Original (extracted fields from the header (action, dkim, dmarc, and spf)), and the received path (the IP/server routes the email took on its way to be delivered. In some examples, under the received path heading, a first item is the original source of the email, and a last item in the list is the destination. The "Sender IP" (as per the field in Ironport) should be the bottom-most non-Target IP. Because this is a free-form header, this may be a best-effort attempt at formatting it into readable columns. Some parts may be missing so they show up as blanks. If a row couldn't be parsed, it can show up as ["COULDN'T PARSE:"+the original line].

The scoring and findings 610 can include a total score of the scanned email. The total score can be calculated by summing the scores for the items (e.g., findings) parsed from the emails. The total score may not have an upper limit. Alternatively, the total score can be scaled to a predetermined range or percentage.

In addition or alternatively, the scoring and findings 610 can include a list of scores of respective items (e.g., findings) identified from the email. The scoring and findings 610 can include a list of scores of only items that have been identified as suspicious (e.g., items having scores greater than zero). In the scoring and findings 610, any item having a score exceeding a predetermined value (e.g., 4 or greater) can be marked as "malicious" to draw more attention to it. For each item (finding), the scoring and findings 610 can include information representative of the item, and the score of the item. The information can be presented as a human readable string. In addition, the scoring and findings 610 can provide a map of extra information that may give context to the finding.

The relevant artifacts 612 can show a summary of data and objects extracted from the email and its attachments before lookups were performed. The relevant artifacts 612 may exclude things that are whitelisted to reduce the amount of noise. The links, domains, and other clickable objects can be re-formatted so that an email application (e.g., Outlook) does not recognize them as clickable.

The attachments to the email can be included as the attachments 614 to the report 600. The attachments 614 can be added to the report 600 in the same order as they are found in the email. Alternatively, some or all of the attachments to the email are not attached to the report 600.

In some implementations, any file that is over a predetermined size (e.g., 500 Kb) is compressed (e.g., gzip compressed and ".gz" is added to the original file name) and attached to the report. Each attachment size can be tracked and if the total goes over a predetermined size (e.g., 34 Mb), it is not added (sometimes a 'placeholder' file will be included to indicate that it was skipped). Optionally, if the report fails to send after a few attempts, one last attempt is made at sending it without one or more of the attachments (e.g., attachments larger than a particular size), such as binaries and interesting strings.

The attachments 614 can include a decoded email file 622, a lookups file 624, an artifact locations file 626, an email body file 628, a text content file 630, a binary information file 632, and a findings file 634.

The decoded email file 622 ("orig_email_decoded.txt") includes the decoded parts of the original email. The decoded email file 622 can be used for a one-stop shop for all relevant information from the original email, so that a reviewer, such as a security analyst, can look at the decoded email file 622 instead of opening the original email.

Some emails are of file type "multipart", which includes both the text and html parts of the email, as well as encoded versions of attachments. For each section, there is a summary that includes the MIME type of the section, its name (if it has one), a starting tag, the contents, and finally a closing tag. The number of subsections in the multipart can be shown in parentheses. The text body can simply shows the text of the email body. The html body (MIME type=text/html) can show both the raw html and a more readable version of the raw html. The readable version of the html can perform the following modifications to the raw html.

All tags except for <a>, <img>, and <script> are removed.
Large groups of blank lines are condensed down to a single blank line.
A large number of leading spaces are turned into 4 spaces.
Html entities ( , etc) are decoded.

Sometimes an email's plain text and html sections differ, so both should be looked over. The attachments include the hashes of the attachment. The original attachments can be included in the binary information file 632 ("Binaries.zip") as described below.

The lookups file 624 ("all_intel_lookups.txt") can include the external lookups on the artifact that were performed (Bluecoat, VirusTotal, etc.). This file 624 can be used to confirm that an artifact was actually looked up (or to see what the results were) for things like DomainTools or Bluecoat or Ragnarok. Each type of finding may be separated by a group of dashes and newlines for readability.

The artifact locations file 626 ("artifact locations.txt") can include the location of the artifacts found. For example, a hash may be marked as malicious in Ragnarok but now a security analyst needs to find out where that hash came from. The file 626 provides the paths to the artifacts that were included in the report.

The SECTION 1 above shows the hashes of the attachment "pic1.jpg" that is found in one of the multipart sections of the email attachment "[EXTERNAL] test.eml." "Root" in the path means that it came from the top-level email. The SECTION 2 above show the domains/email that was extracted from a text body in the original email. Text bodies do not have a "name" within a multipart section.

The email body file 628 ("phishMe_body.txt") includes the email body of the email that has been reported, if it was present. If a security analyst wants to review the headers of the original email, they are available in the email body file 628.

The text content file 630 ("TXT: {name}.txt" or "InterestingStrings.zip") can include the text contents of a Microsoft Office doc or PDF. In cases where there is just one attachment, the txt content of the string is included as an attachment. If there is more than one attachment, then a zip file is created that includes all of the interesting strings.

The binary information file 632 ("Binaries.zip") can include interesting binaries that were found buried in the email. This can also include the rendered pages of PDFs. In some implementations, the system can scan images included inside PDF documents and will lookup hashes of the images. While these hashes are included in the report, the image files are not included in the file 632 as they can be found inside the original PDF.

In addition, the sent email (.eml file) can be included in the file 632. The file 632 can be password protected with, for example, the standard infected password so antivirus software doesn't scan the zip.

The findings file 634 ("findings.json.txt") can include a json string that contains the gathered information, findings, etc. This file 634 can be used for the system's debugging.

In addition, the attachments 614 can include a multiple addresses file. If more than one addresses in TO or FROM are found, this file is attached which can be passed to a tool to extract the email. The multiple addresses file can only include recipients that are from particular domains, such as trusted internal domains.

Figure 7:
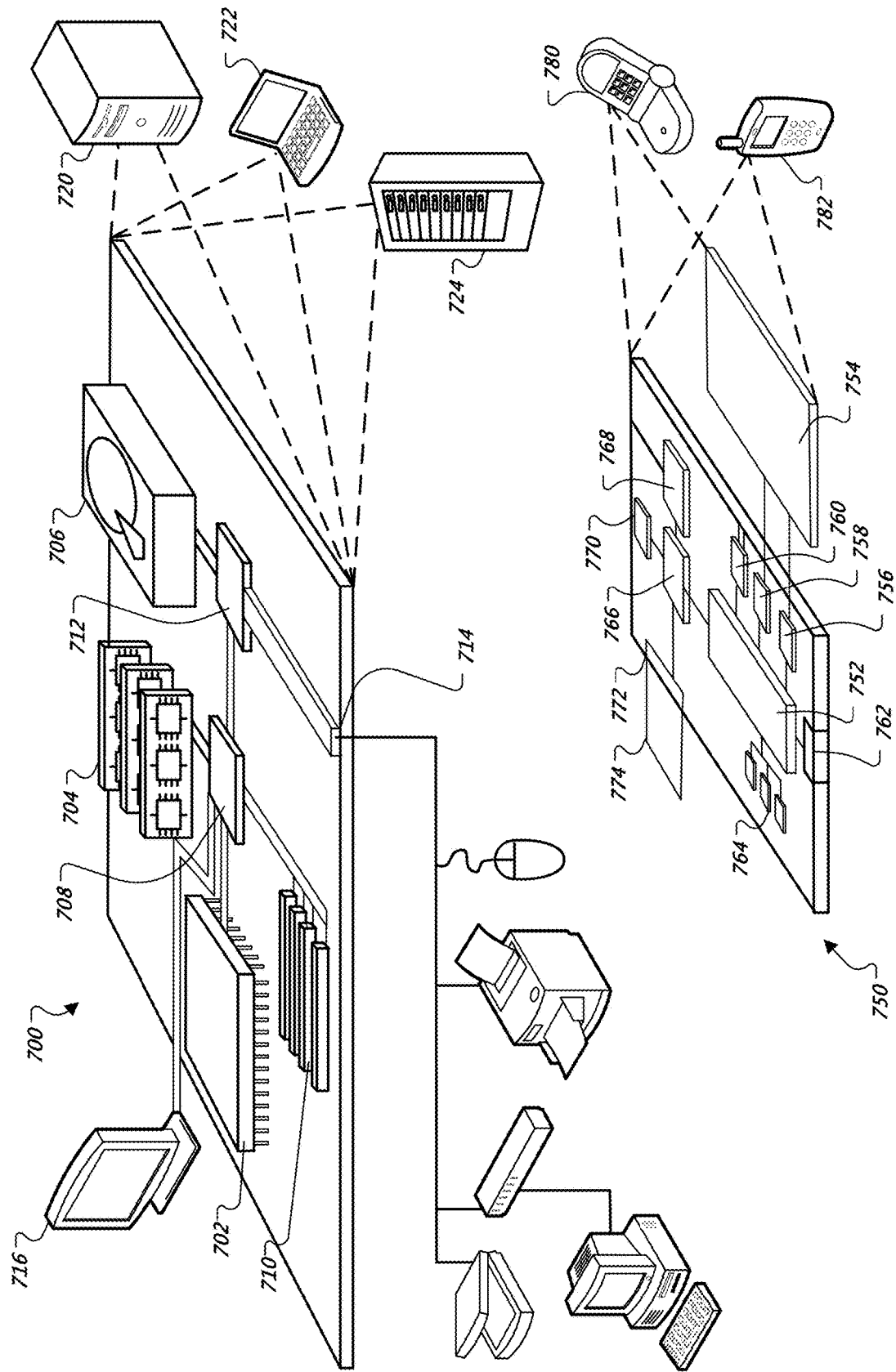
FIG. 7 is a block diagram of computing devices that may be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provided, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for automatically analyzing a potentially malicious email, the method comprising:
retrieving a potential phishing email from a database for automatic analysis, the database storing one or more emails that have been identified as potential phishing by one or more users using one or more user computing devices, wherein the one or more user computing devices are configured to generate a user interface selectable by a user to indicate that an email is potentially malicious;
parsing the potential phishing email by converting the potential phishing email into scannable objects, and scanning the objects to collect findings about the potential phishing email wherein the scannable objects include text objects and binary objects;
checking the potential phishing email against a whitelist;
calculating a score of the potential phishing email based on a phishing rule by:
assigning item scores to the findings, respectively, based on the phishing rule wherein the phishing rule defines first items that categorize emails as malicious; and
calculating the score being a total of the item scores;
determining the potential phishing email to be a malicious email based on (i) the score exceeding a threshold value (ii) the potential phishing being not identified as benign based on the whitelist, and (iii) categorizing the potential phishing email as the malicious email based on the findings including one or more of the first items from the phishing rule;
generating a report in a form of email, the report including an email subject, a list of attachments, the findings, the item scores, and the score;
transmitting the report to a security analyst computing device;
determining the potential phishing email as a benign email based on (i) the score not exceeding the threshold value (ii) the potential phishing email being identified as benign based on the whitelist, wherein the whitelist defines second items that categorize emails as benign, or (iii) categorizing the potential phishing email as a benign email based on the findings including one or more of the second items from the whitelist;
storing the benign email in a benign email database;
updating the whitelist;
updating the phishing rule; and
scanning the benign email database for retesting at a predetermined schedule,
wherein scanning the benign email database comprises:
rechecking the potential phishing email that has been determined as the benign email against the updated whitelist;
calculating a second score of the benign email based on the updated phishing rule by:
assigning second item scores to the findings, respectively, based on the updated phishing rule, and
calculating the second score being a total of the second item scores, and
determining the benign email to be a malicious email based on (i) the second score exceeding the threshold value and (ii) the benign email not being identified as benign based on the updated whitelist.

2. The method of claim 1, wherein scanning the benign email database further comprises:
determining the benign email to remain benign based on (i) the second score not exceeding the threshold value or (ii) the benign email being identified as benign based on the updated whitelist.

3. The method of claim 1, wherein the scannable objects comprise (i) contents of the potential phishing email converted to a text object or HTML email object, (ii) information associated with attachments in the potential phishing email, and (iii) information identifying details about the potential phishing email, wherein the details about the potential phishing email comprise at least one of a name, an email address, a domain ID, and a byte string.

4. The method of claim 1, wherein the whitelist comprises one or more requirements for categorically identifying an email as benign regardless of the findings or other information about the email, wherein the one or more requirements include at least one of predetermined email addresses, predetermined internal domains, predetermined external domains, emails with predetermined patterns or attributes of subjects, headers, bodies, attachments, contents, and other data associated with emails.

5. The method of claim 1, wherein the first items of the phishing rule comprises finding types to which one or more of the findings are categorized, the finding types corresponding to at least one of: an attachment, a domain, a binary stream, a keyword, an analysis of third-party tools, an email body, and an email header.

6. The method of claim 5, wherein assigning item scores to the findings, respectively, based on the phishing rule, comprises:
categorizing each of the findings based on the finding types; and
assigning predetermined item scores to each of the findings that corresponds to the respective categorized finding type.

7. The method of claim 1, wherein calculating the score being a total of the item scores comprises:
summing at least a subset of the item scores; and
scaling the score to a predetermined range or percentage, wherein the score of the potential phishing email indicates a degree of trustworthiness of the potential phishing email.

8. The method of claim 1, wherein scanning the benign email database further comprises iteratively updating the updated whitelist in response to attributes of the benign email database changing from benign to malicious or malicious to benign.

9. A server comprising:
a data processing apparatus; and
a memory device storing instructions that when executed by the data processing apparatus cause the server to perform operations comprising:
retrieving a potential phishing email from a database for automatic analysis, the database storing one or more emails that have been identified as potential phishing by one or more users using one or more user computing devices, wherein the one or more user computing devices are configured to generate a user interface selectable by a user to indicate that an email is potentially malicious;
parsing the potential phishing email by converting the potential phishing email into scannable objects, and scanning the objects to collect findings about the potential phishing email, wherein the scannable objects include text objects and binary objects;
checking the potential phishing email against a whitelist;

calculating a score of the potential phishing email based on a phishing rule by:
assigning item scores to the findings, respectively, based on the phishing rule, wherein the phishing rule defines first items that categorize emails as malicious; and
calculating the score being a total of the item scores;
determining the potential phishing email to be a malicious email based on (i) the score exceeding a threshold value (ii) the potential phishing being not identified as benign based on the whitelist, and (iii) categorizing the potential phishing email as the malicious email based on the findings including one or more of the first items from the phishing rule;
generating a report in a form of email, the report including an email subject, a list of attachments, the findings, the item scores, and the score;
transmitting the report to a security analyst computing device;
determining the potential phishing email as a benign email based on (i) the score not exceeding the threshold value (ii) the potential phishing email being identified as benign based on the whitelist, wherein the whitelist defines second items that categorize emails as benign, or (iii) categorizing the potential phishing email as a benign email based on the findings including one or more of the second items from the whitelist;
storing the benign email in a benign email database;
updating the whitelist;
updating the phishing rule; and
scanning the benign email database for retesting at a predetermined schedule,
wherein scanning the benign email database comprises:
rechecking the potential phishing email that has been determined as the benign email against the updated whitelist;
calculating a second score of the benign email based on the updated phishing rule by:
assigning second item scores to the findings, respectively, based on the updated phishing rule, and
calculating the second score being a total of the second item scores, and
determining the benign email to be a malicious email based on (i) the second score exceeding the threshold value and (ii) the benign email not being identified as benign based on the updated whitelist.

10. The server of claim 9, wherein scanning the benign email database further comprises:
determining the benign email to remain benign based on (i) the second score not exceeding the threshold value or (ii) the benign email being identified as benign based on the updated whitelist.

11. The server of claim 9, wherein the first items of the phishing rule comprises finding types to which one or more of the findings are categorized, the finding types corresponding to at least one of: an attachment, a domain, a binary stream, a keyword, an analysis of third-party tools, an email body, and an email header.

12. The server of claim 11, wherein assigning item scores to the findings, respectively, based on the phishing rule, comprises:
categorizing each of the findings based on the finding types; and
assigning predetermined item scores to each of the findings that corresponds to the respective categorized finding type.

13. The server of claim 9, wherein calculating the score being a total of the item scores comprises:
summing at least a subset of the item scores; and
scaling the score to a predetermined range or percentage, wherein the score of the potential phishing email indicates a degree of trustworthiness of the potential phishing email.

14. The server of claim 9, wherein the scannable objects comprise (i) contents of the potential phishing email converted to a text object or HTML email object, (ii) information associated with attachments in the potential phishing email, and (iii) information identifying details about the potential phishing email, wherein the details about the potential phishing email comprise at least one of a name, an email address, a domain ID, and a byte string.

15. The server of claim 9, wherein the whitelist comprises one or more requirements for categorically identifying an email as benign regardless of the findings or other information about the email, wherein the one or more requirements include at least one of predetermined email addresses, predetermined internal domains, predetermined external domains, emails with predetermined patterns or attributes of subjects, headers, bodies, attachments, contents, and other data associated with emails.

16. A non-transitory computer-readable medium having stored therein a program for causing a computer to execute a process of analyzing a potentially malicious email, the process comprising:
retrieving a potential phishing email from a database for automatic analysis, the database storing one or more emails that have been identified as potential phishing by one or more users using one or more user computing devices, wherein the one or more user computing devices are configured to generate a user interface selectable by a user to indicate that an email is potentially malicious;
parsing the potential phishing email by converting the potential phishing email into scannable objects, and scanning the objects to collect findings about the potential phishing email wherein the scannable objects include text objects and binary objects;
checking the potential phishing email against a whitelist;
calculating a score of the potential phishing email based on a phishing rule by assigning item scores to the findings, respectively, based on the phishing rule, wherein the phishing rule defines first items that categorize emails as malicious, and calculating the score being a total of the item scores;
determining the potential phishing email to be a malicious email based on (i) the score exceeding a threshold value, (ii) the potential phishing being not identified as benign based on the whitelist, and (iii) categorizing the potential phishing email as the malicious email based on the findings including one or more of the first items from the phishing rule;
generating a report in a form of email, the report including an email subject, a list of attachments, the findings, the item scores, and the score;
transmitting the report to a security analyst computing device;
determining the potential phishing email as a benign email based on (i) the score not exceeding the threshold value (ii) the potential phishing email being identified as benign based on the whitelist, wherein the whitelist defines second items that categorize emails as benign, or (iii) categorizing the potential phishing email as a benign email based on the findings including one or more of the second items from the whitelist;
storing the benign email in a benign email database;
updating the whitelist;
updating the phishing rule; and
scanning the benign email database for retesting at a predetermined schedule,
wherein scanning the benign email database comprises:
rechecking the potential phishing email that has been determined as the benign email against the updated whitelist;
calculating a second score of the benign email based on the updated phishing rule by:
assigning second item scores to the findings, respectively, based on the updated phishing rule, and
calculating the second score being a total of the second item scores, and
determining the benign email to be a malicious email based on (i) the second score exceeding the threshold value and (ii) the benign email not being identified as benign based on the updated whitelist.

17. The non-transitory computer-readable medium of claim 16, wherein the first items of the phishing rule comprises finding types to which one or more of the findings are categorized, the finding types corresponding to at least one of: an attachment, a domain, a binary stream, a keyword, an analysis of third-party tools, an email body, and an email header.

18. The non-transitory computer-readable medium of claim 16, wherein the process further comprises:
determining the potential phishing email as a benign email based on the score not exceeding the threshold value or (ii) the potential phishing email being identified as benign based on the whitelist; and
storing the benign email in a benign email database.

19. The non-transitory computer-readable medium of claim 17, wherein assigning item scores to the findings, respectively, based on the phishing rule, comprises:
categorizing each of the findings based on the finding types; and
assigning predetermined item scores to each of the findings that corresponds to the respective categorized finding type.

20. The non-transitory computer-readable medium of claim 16, wherein calculating the score being a total of the item scores comprises:
summing at least a subset of the item scores; and
scaling the score to a predetermined range or percentage,
wherein the score of the potential phishing email indicates a degree of trustworthiness of the potential phishing email.

* * * * *